United States Patent Office 3,270,043
Patented August 30, 1966

3,270,043
ALIPHATIC AND ALICYCLIC OXIMINO SULFATES AND THEIR PREPARATION
Herbert K. Wiese, Cranford, and Paul E. Burton, Westfield, N.J., assignors to Esso Research and Engineering Company, a corporation of Delaware
No Drawing. Filed Feb. 25, 1965, Ser. No. 435,361
25 Claims. (Cl. 260—458)

This is a continuation-in-part of copending application Serial No. 244,549, filed December 14, 1962, and now abandoned.

This invention relates to novel compositions of matter and to processes for preparing them. More specifically, the invention relates to novel oximino sulfates and to processes for their preparation.

It is known in the art that olefins can be converted to their nitrosochlorides by dissolving them in alcohol, such as methyl alcohol, or in organic acids, such as acetic acid, and treating the dissolved olefin with nitrosyl chloride. These processes, however, are generally regarded as unsatisfactory due to the relatively low yields of the desired nitrosochloride product produced. In addition, if the corresponding oximino chloride is desired, the thus-prepared nitrosochloride must be subsequently rearranged. In this additional stage, the nitrosochloride is maintained in contact with hydrogen chloride in an organic reaction medium until a desired rearrangement is effected. Heretofore, however, unsatisfactory yields of the desired oximino chloride product have been produced. In addition to the foregoing drawbacks, other disadvantages are manifested relative to the product per se. For example, an oximino compound having a sulfate ester group attached next to the oximino group, rather than a chlorine atom as with the oximino chlorides, would be advantageous over said oximino chloride. The advantage is readily apparent inasmuch as a sulfate ester is comparatively more reactive than a chloride group.

Accordingly, it is an object of this invention to produce novel oximino sulfates directly. It is another object of this invention to prepare oximino sulfate compounds directly and in relatively high yields. It is a further object of this invention to prepare oximino sulfate compounds which have a sulfate ester group attached next to the oximino group in said compound thereby resulting in a more reactive compound since the sulfate ester group is more reactive than the chloride group. Other objects and advantages will become apparent from a consideration of the following description and claims.

In accordance with the present invention, it is found that novel oximino sulfate compounds can be produced by the reaction of an olefin with nitrosyl sulfuric acid. The oximino sulfate compounds, which are internal oximino sulfate salts, produced by the process are represented by the following two formulas:

(I) 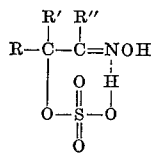

(II) 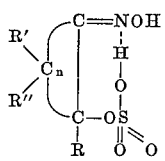

wherein R, R' and R'' each may be hydrogen, an alkyl group containing from 1 to 20 carbon atoms or an aromatic ring such as, for example an unsubstituted monocyclic aryl group. In the cyclic compounds represented by Formula II, $n$ is 1 to 20. It is to be understood that two or more oximino sulfate groups can be present in the same molecule, as, for example, in the case when the starting material is a polyolefin.

In carrying out the process according to this invention, nitrosyl sulfuric acid is reacted with an olefinic compound wherein said olefinic compound is either a gas or liquid. The following chemical equation is representative of the reaction and describes the reaction between trimethylethylene and nitrosyl sulfuric acid:

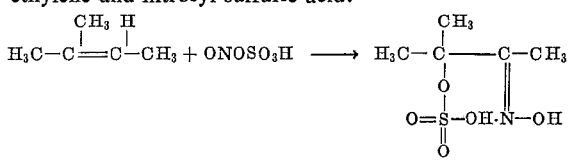

The reaction of the instant invention is carried out at pressures of from less than atmospheric up to pressures of about 100 atmospheres, at temperatures of from about $-100°$ to about $100°$ C. preferably in the presence of a solvent or a diluent serving as a common solvent for the olefin and the nitrosyl sulfuric acid. The presence of a catalyst is not found to be critical or even necessary in the process of the present invention. The reaction time is usually from several minutes up to about ten hours depending on the reactants and the conditions employed in the process. It is found, however, that some olefinic starting materials react almost instantaneously, even at low reaction temperatures. When the reaction is complete, the relatively non-volatile constituents of the mixture are concentrated, for instance by evaporation of the relatively volatile constituents thereof, thereby leaving the crude oximino sulfate as residue. The latter is purified further by effecting crystallization or by washing the crude product with a suitable solvent to remove the impurities. In some instances the oximino sulfate compounds are crystalline solids insoluble in the reaction mixture and can be isolated from the reaction mixture by a simple filtration technique. In order to facilitate recovery, it is preferable to employ substantially pure olefinic reactants.

The olefinic compounds amenable to the present invention include monoolefins and polyolefins. The olefinic compounds contemplated in the present invention include, among others, aliphatic olefins, alicyclic olefins, aryl substituted olefins, conjugated and non-conjugated polyolefins, both aliphatic and alicyclic, as well as polymers containing unsaturation. Also included are the halogenated derivatives of the above compounds, i.e. such compounds with fluorine, chlorine, bromine and iodine as substituents, e.g., 4-chloro-1-butene and the like.

Aliphatic olefins suitable for use in the present invention are those having the general formula $C_nH_{2n}$ wherein $n$ is from 2 to 50. Examples of such olefins are ethylene, propylene, butene-2, 2-methyl-butene-2, isobutylene, diisobutylene, hexene-1, hexadecene-1, and the like.

Alicyclic olefins suitable for use in the present invention are those having the general formula $C_nH_{2n-2}$ wherein $n$ is from 3 to 20, such as cyclopentene, alkylated cyclopentenes, cyclohexene, alkylated cyclohexenes, cyclooctene, cyclododecene, and the like. Such cyclic polyolefins as cyclooctadiene, cyclododecatriene, cyclododecadiene and others can also be used in the present invention.

Aryl substituted olefins suitable for use in the present invention are those having from 2 to about 16 carbon atoms in the olefinic side chain. Suitable olefins include, for example, styrene, 4-phenyl, 1-butene, 5-phenyl, 2-pentene, 1-phenyl, 1,3-butadiene, and the like.

Examples of non-conjugated diolefins which may be used in the present invention are 1,5-hexadiene, 1,6-decadiene, 2,7-dodecadiene, and the like.

The polymers containing unsaturation suitable for use include those polymers having a relatively wide range of molecular weights and structures. Molecular weights may vary from a few hundred up to 500 thousand. Polymers suitable for use include polybutadiene, polyisoprene, butadiene-styrene copolymer and the like. Also included as being suitable are bicycloheptene, bicycloheptadiene, dicyclopentadiene, methylcyclopentadiene dimer, and the like. In order to be operable in the process of the present invention it is critical that the above polymers have some type of unsaturation in the polymer molecule, for example, Type I (pendant vinyl type), Type II (internal cis or trans type), Type III (tertiary type), Type IV (tri substituted type) and Type V (internal-branched type) of unsaturation. All or part of the unsaturation present in the polymer molecule may be converted to oximino sulfates by reacting with nitrosyl sulfuric acid.

The solvent used as the reaction medium may be any one of volatile solvents which are liquid under the conditions of the reaction and which is resistant to nitrosyl sulfuric acid, such as, for example, paraffinic hydrocarbons, halogenated hydrocarbons, e.g., dichloromethane, hydrocarbon ethers, e.g., diethylether, acetic acid, halogenated acetic acid, liquid $SO_2$, nitrohydrocarbons, sulfuric acid, dimethylsulfoxide, phosphoric acid, and the like. Liquid sulfur oxide is the preferred solvent.

The reaction can be carried out at less than atmospheric, atmospheric or at superatmospheric pressure, depending upon the other conditions of operation. Thus the operating pressure will depend on the particular olefin feed and solvent used. The preferred pressure range is from about 1 to 75 atmospheres.

It is found that optimum results are obtained at reaction temperatures of from about −100° to 100° C., preferably from about −10° to 75° C.

The proportions of the reagents are preferably chosen such that at least one mole of olefin is present for each mole of nitrosyl sulfuric acid. While a molecular excess of the olefin can be employed, no material advantage results thereby. The proportion of inert solvent can be such as to constitute less than 1 to about 100 parts or more by volume for each part by weight of nitrosyl sulfuric acid, one part by volume being equivalent to the volume of one part by weight of water at the same temperature. It should be noted that although a solvent is preferred, the reaction can be carried out without a solvent.

As indicated above, the reaction need not be carried out in the presence of a catalyst in order to obtain the optimum yields which characterize the present invention.

The duration of the reaction depends upon the temperature, pressure, concentration of the reagents and varies over a wide range, hence the reaction period is not critical to the process of this invention. The order in which the reactants are added is not critical. The reaction can be carried out by either adding the nitrosyl sulfuric acid slowly to the reaction mixture or by adding the olefin to the nitrosyl sulfuric acid.

It is obvious that the novel oximino compounds having a sulfate ester group attached next to the oximino group as described and produced above, may be employed as intermediates in a number of well known chemical reactions. Thus, the sulfate ester group which is attached next to the oximino group makes said compound extremely interesting and valuable as reactants in such well known chemical reactions as hydrolyzation of the sulfate ester and oximino group and hydrogenation of the oximino compound so as to produce derivatives such as, for example, methyl acrylic acid, acrylic acid, 2,3-dimethylethylene imine, 2-amino-3-hydroxy butane, methyl isopropenyl ketone, methylvinyl ketone, the ester of acrylic acid, and the like. Further, the compounds of the instant invention are highly advantageous as intermediates inasmuch as the hydroxy amines typified above are well known to be starting materials for making textile softeners, corrosion inhibitors, antistatic agents, and the like. In addition, the hydroxy ketones referred to above are well known for use as solvents for nitrocellulose, vinyl resins, epoxy resins, and the like.

The process will be understood more readily from the following examples.

EXAMPLE 1

A slurry of 127 grams of nitrosyl sulfuric acid in approximately 400 cc. of liquid sulfur dioxide maintained in the temperature range of −4° C. to −5° C., 56 grams of butene-2 was slowly added with stirring over a period of 1.7 hours. The mixture was filtered to remove the insoluble oximino sulfate which was washed with dichloromethane. After drying in a vacuum, the solid weighed 149 grams, representing an 81 percent yield of the oximino sulfate. The resulting oximino sulfate, i.e., 3-sulfato-2-butanone oxime, had a melting point of 87° C. to 91° C.

EXAMPLES 2 TO 13

In a manner similar to Example 1, a series of experiments were run with the data resulting therefrom set forth as Examples 2 to 13 in the following Table I.

Table I.—Reaction of olefins with nitrosyl sulfuric acid

| Example No. | Olefin | | Nitrosyl Sulfuric Acid | Solvent | | Conditions | | | Yield of Oximino Sulfate [2] |
|---|---|---|---|---|---|---|---|---|---|
| | Type | Gm. | Gm. | Type | Ml. | Manner of Add'n [1] | Reaction Time (hr.) | Reaction Temp. (° C.) | |
| 2 | 2-methyl-butene-2 | 40.0 | 63.9 | $SO_2$ | 360 | N | 1.0 | −3 to −6 | 69 |
| 3 | Butene-2 | 57.0 | 127.1 | $SO_2$ | 400 | N | 2.0 | −2 to −10 | 92 |
| 4 | ----do---- | 39.4 | 32.2 | $CH_2Cl_2$ | 200 | N | 1.8 | 0 to 18 | 58 |
| 5 | ----do---- | 28.6 | 29.1 | $(C_2H_5)_2O$ | 200 | N | 2.8 | −3 to 18 | 42 |
| 6 | ----do---- | 25.4 | 30.6 | $CH_3CO_2H$ | 200 | I | 1.5 | 19 to 29 | [3] 64 |
| 7 | Propene | | 26.6 | {$SO_2$ / $CHCl_3$} | {60 / 300} | N | 2.9 | 1 to 8 | 27 |
| 8 | Hexadecene-1 | 24.4 | 13.4 | {$SO_2$ / $CHCl_2$} | {100 / 100} | N | 4.5 | 0 to −10 | 35 |
| 9 | Hexene-1 | 42.2 | 64.5 | $SO_2$ | 410 | N | 1.1 | −3 to −11 | 64 |
| 10 | Cyclohexene | 24.0 | 32.5 | $SO_2$ | 340 | N | 0.9 | −6 to −9 | 83 |
| 11 | 2-methyl propene (isobutylene) | 31.0 | 63.5 | $SO_2$ | 250 | N | 1.5 | −8 to −12 | 42 |
| 12 | Hexene-1 | 42.0 | 67.8 | $H_2SO_4$(g.) | 15.2 | I [4] | 1.8 | 15 to 35 | 55 |
| 13 | Polybutadiene | 107.2 | 43.0 | None | | N | 6.2 | 20 to 45 | ([5]) |

[1] Manner of addition: N-olefin added to nitrosyl sulfuric acid plus solvent. Inverse addition: I-nitrosyl sulfuric acid added to olefin plus solvent.
[2] Yields are based on nitrosyl sulfuric acid charged.
[3] Product consisted of a mixture of oximino sulfate and oximino acetate.
[4] Nitrosyl sulfuric acid plus sulfuric acid added to olefin.
[5] Recovered polymer (85 g.) contained 0.05 moles oximino sulfate. Exact yield data cannot be calculated because of incomplete reaction of nitrosyl sulfuric acid. Molecular weight of original polymer was around 1100.

Non-limiting examples of the new oximino sulfate composition produced in such experiments and resulting from the reaction of nitrosylsulfuric acid with the respective olefins are: 3-methyl-3-sulfato-2-butanone oxime from 2-methyl-butene-2, 3-sulfato-2-butanone oxime from butene-2, 2-sulfatopropanal oxime from propene, 2-sulfatohexadecanal oxime from hexadecene-1, 2-sulfatocyclohexanone oxime from cyclohexene, 3-methyl-3-sulfato-2-propanal oxime from isobutylene, 2-sulfatohexanal oxime from hexene-1.

What is claimed is:

1. An internal oximino sulfate salt having the general formula:

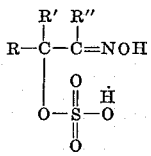

wherein R, R' and R" are each selected from the group consisting of a hydrogen atom, alkyl groups containing 1 to 20 carbon atoms and an unsubstituted monocyclic aryl group.

2. 3-sulfato-2-butanone oxime.
3. 2-sulfatopropanal oxime.
4. 3-methyl-3-sulfato-2-butanone oxime.
5. 2-sulfatohexanal oxime.
6. 2-methyl-2-sulfatopropanal oxime.
7. 2-sulfatohexadecanal oxime.
8. An internal oximino sulfate salt having the general formula:

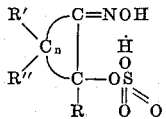

wherein R, R' and R" are each selected from the group consisting of a hydrogen atom, alkyl groups containing 1 to 20 carbon atoms and an unsubstituted monocyclic aryl group and wherein $n$ is from 1 to 20.

9. 2-sulfatocyclohexanone oxime.
10. 2-sulfatocyclopentanone oxime.
11. The process for the preparation of an oximino sulfate compound which comprises reacting an olefin selected from the group consisting of unsubstituted and chlorine substituted olefinic compounds with nitrosylsulfuric acid.
12. A process for the preparation of internal oximino sulfate salts which comprises adding nitrosylsulfuric acid to an olefin selected from the group consisting of unsubstituted and chlorine substituted olefinic compounds at temperatures of from about $-100°$ C. to $100°$ C. and at pressures of from one atmosphere up to 100 atmospheres in the presence of an inert solvent serving as a common solvent for the olefin and the nitrosylsulfuric acid.
13. The process of claim 12 in which the olefin is an aliphatic olefin having 2 to 50 carbon atoms.
14. The process of claim 12 in which the olefin is an alicyclic olefin having 3 to 20 carbon atoms.
15. The process of claim 12 in which the olefin is an aryl substituted olefin having from 2 to 16 carbon atoms in the olefinic side chain.
16. The process of claim 12 in which the olefin is a polymer containing unsaturation in the polymer molecule.
17. The process of claim 16 in which the polymer is polybutadiene.
18. A process for the preparation of internal oximino sulfate salts which comprises adding substantially equimolar amounts of nitrosylsulfuric acid to an olefin selected from the group consisting of unsubstituted and chlorine substituted olefinic compounds at temperatures of from about $-10°$ C. to $50°$ C. and at pressures of from about 1 to 75 atmospheres in the presence of liquid sulfur dioxide.
19. The process of claim 18 in which from less than 1 to about 100 parts by volume of sulfur dioxide for each part by weight of nitrosylsulfuric acid is employed.
20. The process of claim 18 in which the olefin is propylene.
21. The process of claim 18 in which the olefin is 2-methylbutene-2.
22. The process of claim 18 in which the olefin is hexadecene-1.
23. The process of claim 18 in which the olefin is butene-2.
24. The process of claim 18 in which the olefin is cyclohexene.
25. The process of claim 18 in which the olefin is 4-chloro-1-butene.

References Cited by the Examiner
FOREIGN PATENTS 1,068,708  11/1959  Germany.

OTHER REFERENCES

Groggins: "Unit Processes in Organic Synthesis," 5th edition, page 349 (1958).

CHARLES B. PARKER, *Primary Examiner.*

FLOYD D. HIGEL, *Assistant Examiner.*